Jan. 25, 1966          J. S. BOYLE ETAL                3,231,102
                    AUTOMATIC BREAKDOWN MACHINE
Filed Feb. 26, 1963                              4 Sheets-Sheet 1

INVENTORS
John S. Boyle
Paul A. Rennord
Gerald N. Nelson

BY *Leslie G. Noller &*
*Daniel C. Block*
ATTORNEYS

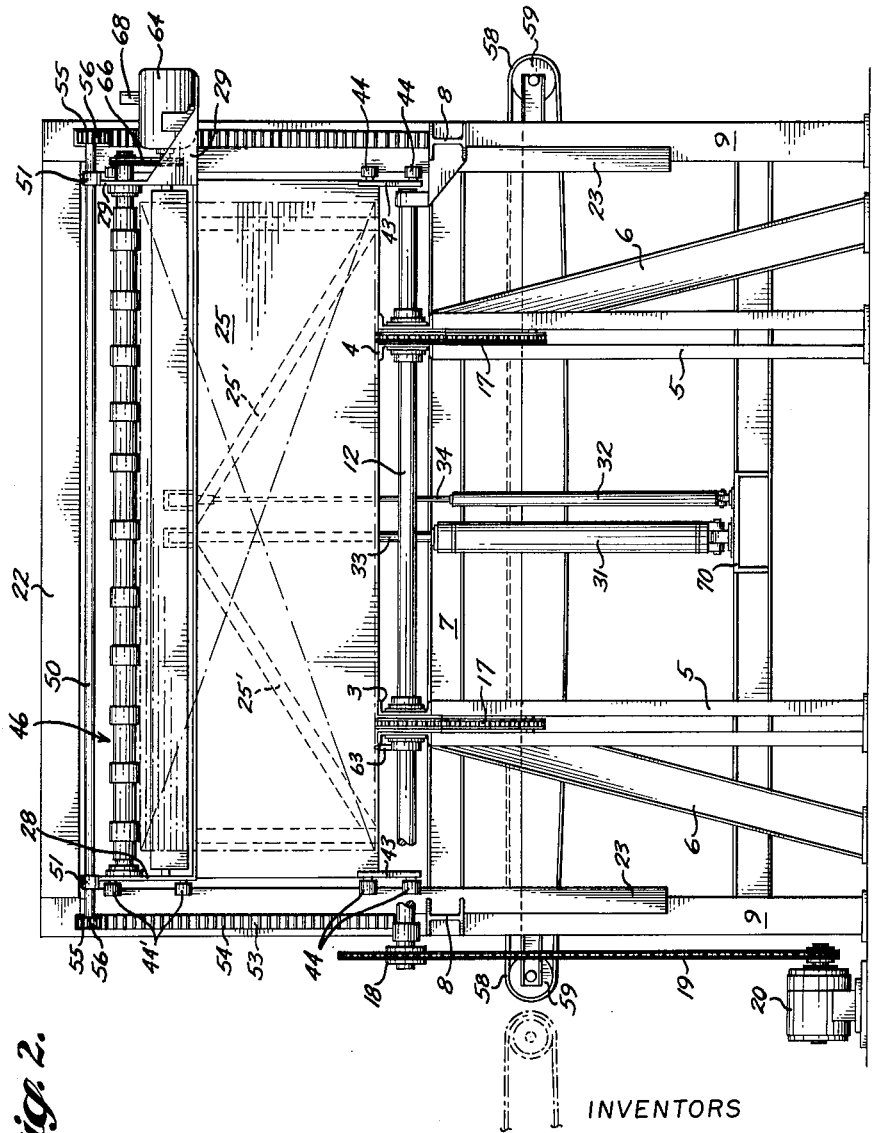

Jan. 25, 1966  J. S. BOYLE ETAL  3,231,102
AUTOMATIC BREAKDOWN MACHINE
Filed Feb. 26, 1963  4 Sheets-Sheet 3

INVENTORS
John S. Boyle
Paul A. Rennord
Gerald N. Nelson

BY
ATTORNEYS

Jan. 25, 1966   J. S. BOYLE ETAL   3,231,102
AUTOMATIC BREAKDOWN MACHINE
Filed Feb. 26, 1963   4 Sheets-Sheet 4
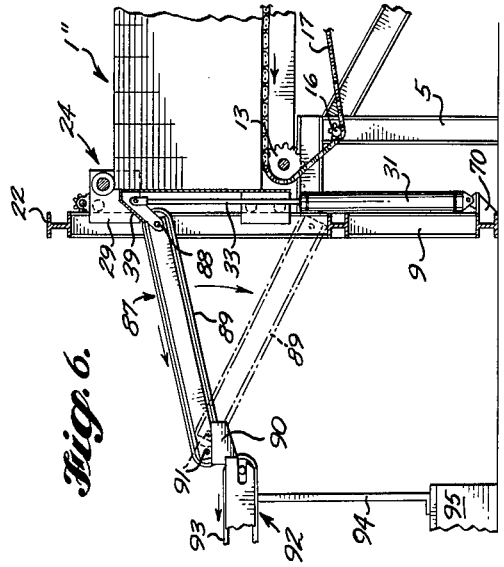
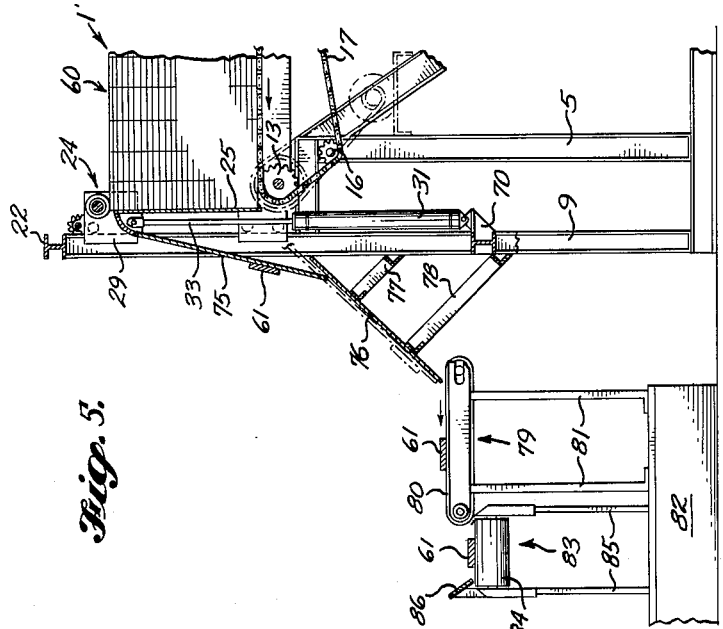
INVENTORS
John S. Boyle
Paul A. Rennord
Gerald N. Nelson
BY
ATTORNEYS

United States Patent Office 3,231,102
Patented Jan. 25, 1966

3,231,102
AUTOMATIC BREAKDOWN MACHINE
John S. Boyle, Tacoma, Wash., Paul A. Rennord, Marshfield, Wis., and Gerald N. Nelson, Puyallup, Wash., assignors to Weyerhaeuser Company, Tacoma, Wash., a corporation of Washington
Filed Feb. 26, 1963, Ser. No. 261,070
5 Claims. (Cl. 214—8.5)

This invention relates to a machine that automatically conveys boards from a rectangular stack to a production line. More specifically, this invention relates to a machine that feeds random length boards from a uniform size stack to a production line.

In an end jointing and gluing operation, it is the practice to cut up long defective boards into short defective free boards. These short defective free boards are then sorted for color and grain and stored in rectangular packages 4' wide x 4' high x 8' long or 3' wide x 3' high x 7' long. When it is desired to end joint these short defective free boards, the short length boards are fed into a sawing machine that forms the end joints and then the end joints are glued together in a gluing and curing machine. The jointed boards are then cut into uniform lengths for further handling.

In the past, it has been the practice to employ a tilting breakdown hoist to get the stack into a transfer mechanism for feeding the stack into the production assembly.

When using this type of tilting breakdown hoist, the rectangular packages of random length boards are placed on a support and then tilted toward the hoist so that the boards can slide onto a transfer mechanism. However, due to the random lengths of the defective free boards in the rectangular package, the tilting hoist scrambles the boards and they get to the feeding station for the jointing operation in a poor position to be fed efficiently.

It is an object of this invention to provide an automatic breakdown machine to transfer random length boards from a uniform stack in a uniform and efficient manner.

Another object of this invention is to provide an automatic breakdown machine that transfers one layer of random length boards at a time from a uniform stack onto a transfer belt.

Another object of this invention is to provide an automatic breakdown machine provided with a roller that has continuous motion to feed one layer of random length boards at a time from a uniform stack onto a transfer belt.

These and other objects and advantages will become manifestly clear to those persons skilled in the art when taken in conjunction with the following detailed description and appended drawings, wherein:

FIGURE 2 is an end view of the automatic breakdown machine, partly in section.

FIGURE 5 is a side elevation view, partly in cross-section, of a modified automatic breakdown machine.

FIGURE 6 is a side elevational view, partly in cross-section, of another automatic breakdown machine.

Figure 1:
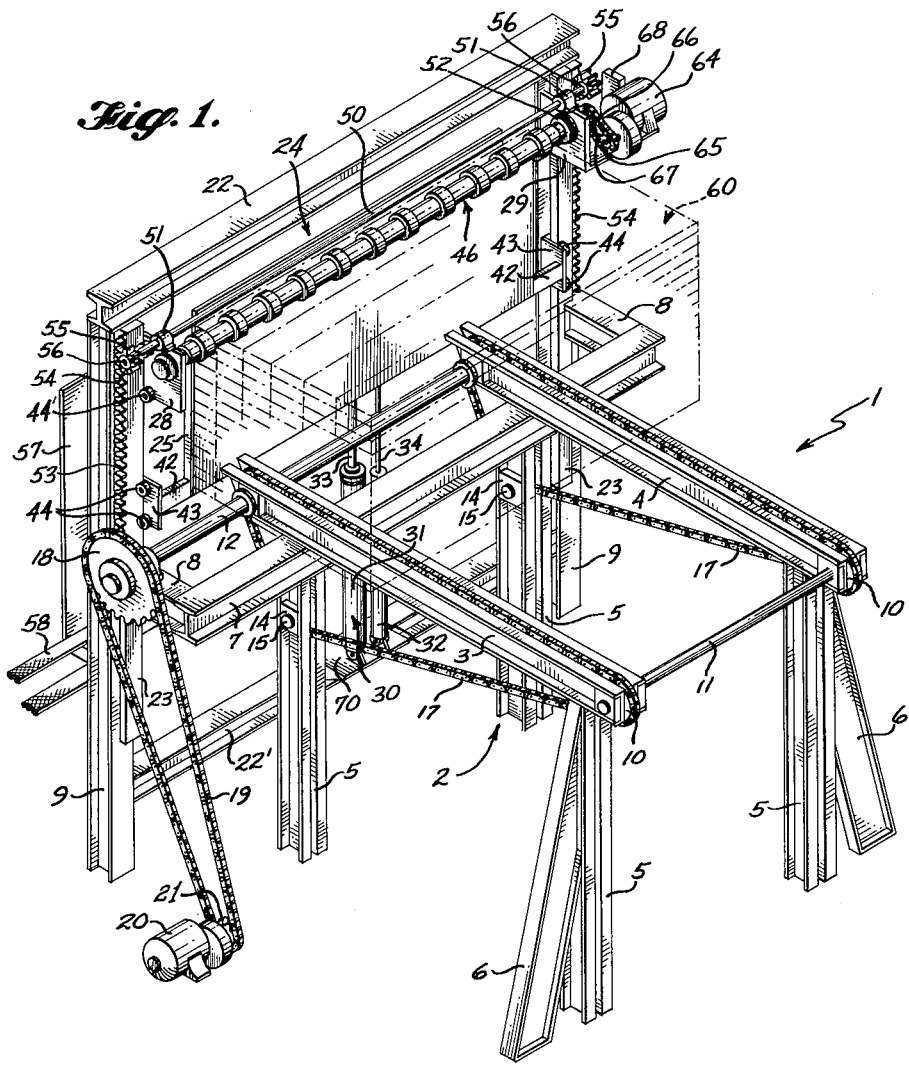
FIGURE 1 is a perspective view of the automatic breakdown machine.
Figure 4:
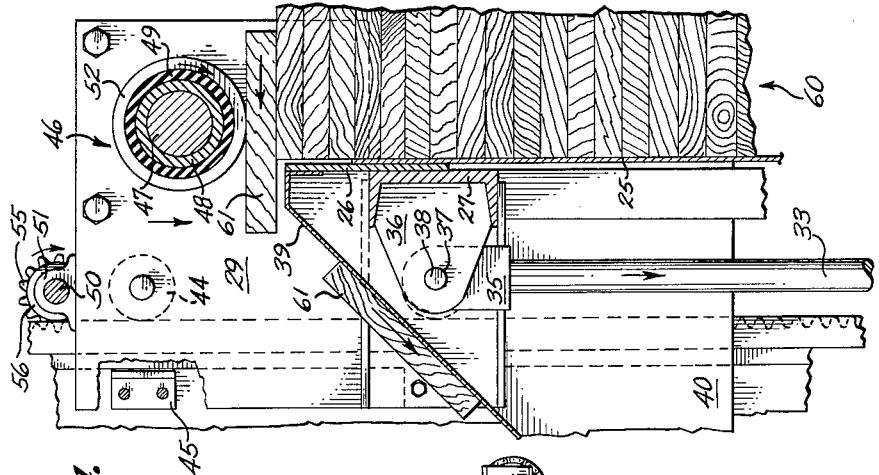
FIGURE 4 is a cross-sectional enlarged view showing the details of the feeding mechanism.
Figure 3:
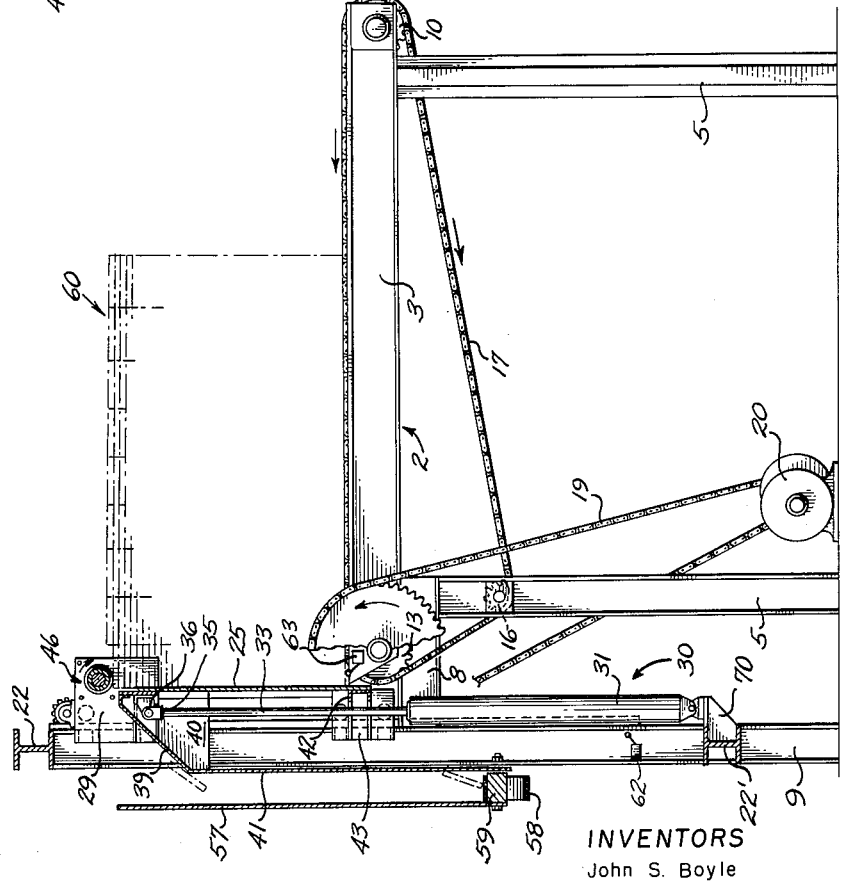
FIGURE 3 is a side elevation of the automatic breakdown machine, partly in cross-section, to show internal details.

Referring to FIGURES 1-4 inclusive of the drawings, generally indicated at 1 is the automatic breakdown machine. The automatic breakdown machine 1 generally comprises a supporting framework 2 including a pair of horizontal spaced apart rails 3 and 4 that are supported by vertical upstanding posts 5. The two posts 5 spaced at one end of the horizontal rails 3 and 4 are provided with angular vertical support legs 6 that are connected to the posts 5 in a well-known manner to balance the support members 5. The other pair of posts 5 are connected into a horizontal rail 7 that extends transversely of the horizontal rails 3 and 4 and below the rails 3 and 4. The ends of the horizontal rail 7 are connected to support arms 8 which are in turn connected to a pair of elongated vertical support rails 9.

Each of the members 3, 4 and 5 is comprised of a pair of channel irons spaced back-to-back with respect to each other with a space therebetween. Between the rails 3 and 4 is mounted a pulley 10 interconnected by a shaft 11. Another set of pulleys 13 is connected between the rail members 3 and 4 and also interconnected by a shaft 12. Mounted on the forward pair of rails 5 is a set of idler pulleys 16 mounted in the channel irons by a support member 14 on a pivot shaft 15. Encircling each of the pulleys 10, 13 and 16 is an endless chain member 17 for a purpose to be hereinafter described.

Power is transmitted to the shaft 12 from a pulley 18 mounted on one end of shaft 12 and interconnected to a power source 20, in the form of an electric motor, by another chain 19 interconnecting the pulley 18 and a pulley or sprocket member 21 connected to the power source 20. In this manner, the power source 20 rotates the member 21 and pulleys 18 and also shaft 12 which in turn rotates the chain 17.

Mounted between the vertical elongated support members 9 are an upper cross rail 22 and a lower cross rail 22'. Mounted between the vertical spaced apart rails 9 and between the cross rails 22 and 22' is a gate member 24. The gate member 24 includes a metal plate member 25 having support members 25' in the form of a rectangle mounted for vertical movement between the elongated rail members 9 by a hydraulic motor means generally indicated at 30.

The motor means 30 generally comprises a pair of cylinder means 31 and 32 pivotally mounted on a support plate 70. Extending into the cylindrical members 31 and 32 are piston rods 33 and 34 respectively having connected thereto a piston member, not shown. The upper end of the rod members 33 and 34 are connected to the plate member 25. The connection between rods 33 and 34 and plate member 25 is provided by an enlargement 35 affixed to the upper end of the rods 33 and 34 and provided with a hole therethrough indicated at 37 to receive a pin 38 which extends through the enlargement 35 and a yoke member 36 which is connected to a cross channel iron 27 which is connected to a support beam 26 which in turn is connected to the plate member 25 in any well-known manner, such as by welding. In this manner, a gate means 24 can be moved up and down by the hydraulic motor means 30.

Connected to the upper end of the vertical sides of the plate member 25 are end plates 28 and 29. This connection is formed by welds or any other well-known mechanism. Below the end plates 28 and 29 is connected a pair of spaced side support plates 40 that support a slide member 39 that is connected to the support beam 26. As shown, the slide member 39 is disposed at an angle with respect to the vertical plate member 25. Parallel with the lower end of the plate member 25 is connected a horizontal supporting arm 42 that is connected to spaced guide roller support plates 43. Carried by the support plate 43 are a pair of rollers 44 that co-operate with a guide rail or bar 23 connected to the vertical post 9. Also connected to the members 28 and 29 are other roller members 44' that also co-operate and roll along the guide bar 23.

A roller mechanism 46 is interconnected between the plate members 28 and 29. This roller mechanism consists of a shaft 47 which is covered by another shaft member 48 and which mounts foam rubber or rubber-like material 49 that engages board member 61 to slide the same onto the slide member 39. One end of the roller mechanism 46 extends through the plate member 29 as through bearing members 52 and is connected to a power source 64. The power source 64 conveys motion to the roller member 46 through the mechanism of a sprocket member 65 and 67 connected by a chain member 66. In this manner the roller mechanism 46 will turn in a clockwise direction and kick the individual board 61 from the stack 60. If desired, a safety switch 68 can be interconnected to the power source 64 in a well-known manner so that the power source 64 will be cut off if the board member 61 tangles or in any other way overloads the power source 64.

Also mounted between the plate members 28 and 29 is a shaft member 50 extending through bearing members 51. At each end of the shaft member 50 is mounted a sprocket wheel 56 having mounted thereon teeth 55 that co-operate with a guide bar 53 mounted on the rails 9. The guide bar 53 is provided with teeth 54 that co-operate with the teeth 55 on the roller members 56. This structure in effect is a rack and pinion gear which aids in the guiding of the gate member 24 as it travels up and down on the rails 9.

Mounted on the outboard end of the slide member 39 is a vertical slide extension 41 that is rigidly mounted to the slide 39.

Mounted below the lower limit of the travel of the slide member 39 is a conveyor mechanism including a belt 58 connected between pulley members 59 that conveys the boards 61 when the boards are moved onto and off of the slide. Mounted on the pulley members 59 is a guide shield 57 that functions to insure that the boards 61 fall onto the belt member 58 rather than onto the floor and out of the way.

Having fully described the detailed structure of the automatic breakdown machine 1, the operation thereof will now be set forth.

It will be assumed that a load of boards 60 has been placed onto the support framework 2 on top of rails 3 and 4 in such a position that the limit switch 63 is depressed. In this position the hydraulic motor means 30 functions to lower the gate 24 in a continuous but slow manner. Moreover, the motor means or power source 64 is transmitting rotative movement to the roller member 46 so that as the gate member 24 moves downwardly along with the roller member 46, the individual random length boards 61 will be kicked off the stack by the rotative movement of the roller 46 onto the slide 39. The boards then fall down the slide and onto the belt 58 and are conveyed onto the production line.

When the gate member 24 reaches the bottom of its stroke, another limit switch 62 is actuated and the motor means 30 reverses its direction of travel and quickly elevates the gate member 24 to its uppermost position. Simultaneously with the actuating of the limit switch 62 all the boards lying under the roller member 46 have been kicked onto the slide member 39 and the limit switch 63 then is elevated. With the elevation of the limit switch 63 a time delay mechanism, not shown, is actuated and after a predetermined length of time, i.e. when the gate member 24 reaches its uppermost position, the motor means 20 is actuated and chain 17 moves the load 60 forwardly until the limit switch 63 is again depressed. At this time the power source 20 is cut off and the next set of boards 60 is ready to be ejected onto the slide 39 since the limit switch 63 is depressed. This will start motor means 30 on its continuous downward travel again.

In the event that the individual random length board 61 becomes fouled up on the slide or in any other manner so that the motor means 30 will not move the gate means 24 downwardly due to the engagement of the roller 46 with the uppermost board 61, the safety switch 68 will cut the motor 64 off when a predetermined load is placed thereon. In this manner the roller 46 is kept from being chewed up by engagement with the board 61.

It should be pointed out that the electrical circuits employed with the automatic breakdown machine 1 are standard circuits employed in the art.

Referring to the embodiment shown in FIGURE 5, there is disclosed another breakdown machine 1'. This machine is identical with respect to the automatic breakdown machine 1 disclosed in FIGURES 1 to 4 except that a different type of ejector mechanism is employed. In this embodiment the slide plate 39, as disclosed in FIGURES 1 to 4 inclusive, is replaced by an elongated slide plate 75 which is pivotally connected to the upper end of the gate member 24. The lower end of the slide plate member 75 engages another angularly spaced plate member 76 that is supported by the rail members 9 by support members 77 and 78.

The lower end of the member 76 terminates above a conveyor mechanism 79 having the usual belts 80 driven by pulleys, not shown. The conveyor mechanism 79 is supported on legs 80 mounted on a support block 82. The boards 61 are conveyed by the conveyor mechanism 79 onto another conveyor mechanism 83 having a shield 86 and provided with the usual belt and pulley 84 mounted on legs 85 and supported on end block 82. The conveyor mechanism 83 moves the boards 61 transversely of the direction of travel of the conveyor mechanism 79 onto the production line.

The operation of the embodiment disclosed in FIGURE 5 is identical in all respects with the mechanism as shown in FIGURES 1 to 4 except for the above described transfer mechanism.

Referring to FIGURE 6 another embodiment is disclosed. In this embodiment another type of transfer mechanism 87 is disclosed. As shown, a belt and pulley mechanism designated at 89 is pivotally connected to the slide member 39 as on a pivot pin 88. The opposite end of the mechanism 87 is pivotally connected at 91 to a support member 90 that is in turn supported by another transfer mechanism 92 having the usual belts 93. The mechanism 92 is supported on legs 94 in a support block 95.

In operation, as the gate member 24 moves downwardly, the transfer mechanism 97 pivots about pivot pins 88 and 91 and moves downwardly in a direction as shown in the dotted lines in FIGURE 6. At the same time, as the boards 61 are ejected off onto the transfer mechanism, the belts 89 driven by pulleys and a power source, not shown, transfer the boards 61 into the production line transfer mechanism 92.

The operation of the embodiment disclosed in FIGURE 6 is identical with the embodiment disclosed in FIGURES 1 to 4 except for the function of the transfer mechanism 87 as set forth above.

While specific details of preferred embodiments have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. An automatic breakdown apparatus, comprising: a supporting framework for supporting and moving a uniformly stacked package of random length boards longitudinally thereof; gate means mounted on said framework; means for moving said gate means vertically with respect to said framework; an ejecting means including a roller means engageable with said random length boards and mounted on said gate means positioned above and in front of said gate means; a slide mounted adjacent said roller means on the discharge side of said stacked package for receiving said random length boards and discharging them.

2. An automatic breakdown apparatus in accordance with claim 1 wherein said roller means is rotated by a power mechanism.

3. An automatic breakdown apparatus in accordance with claim 2 wherein a safety switch is mounted adjacent said power source to cut said power source off when a load on said roller reaches a predetermined maximum.

4. An automatic breakdown apparatus in accordance with claim 1 wherein said gate means is moved continuously in a downward direction.

5. An automatic breakdown apparatus, comprising; a supporting framework for supporting a uniformly stacked package of random length boards including a chain means connected to a power source for moving said package longitudinally thereof; gate means mounted between two support rails of said framework and movable vertically with respect to said support rails; a hydraulic motor means rigidly connected to said gate means to move said gate means in a downward continuous direction at a first speed; rotatable means connected to and movable with said gate means including a power source to rotate the same, said rotatable means engageable with said random length boards to eject the same onto a slide mounted on said gate means; a limit switch engageable by said gate means to reverse the direction of travel of said gate means at a second speed when all of said random length boards have been ejected; and another limit switch engageable by said package to stop movement of said package longitudinally on said framework.

References Cited by the Examiner

UNITED STATES PATENTS

| | | | |
|---|---|---|---|
| 1,683,779 | 9/1928 | Horstkolle | 221—209 X |
| 2,200,708 | 5/1940 | Towne | 221—11 X |
| 2,856,080 | 10/1958 | Mitchell | 214—8.5 |

FOREIGN PATENTS

| | | |
|---|---|---|
| 109,142 | 11/1943 | Sweden. |
| 144,379 | 3/1954 | Sweden. |
| 178,221 | 2/1962 | Sweden. |

GERALD M. FORLENZA, *Primary Examiner.*

MORRIS TEMIN, HUGO O. SCHULZ, *Examiners.*